United States Patent
Hyde et al.

(10) Patent No.: US 9,353,733 B2
(45) Date of Patent: May 31, 2016

(54) DEVICE AND SYSTEM FOR GENERATION OF POWER FROM INTRALUMINAL PRESSURE CHANGES

(75) Inventors: Roderick A. Hyde, Redmond, WA (US); Muriel Y. Ishikawa, Livermore, CA (US); Eric C. Leuthardt, St. Louis, MO (US); Michael A. Smith, Phoenix, AZ (US); Lowell L. Wood, Jr., Bellevue, WA (US); Victoria Y. H. Wood, Livermore, CA (US)

(73) Assignee: Deep Science, LLC, Bellevue, WA (US)

( * ) Notice: Subject to any disclaimer, the term of this patent is extended or adjusted under 35 U.S.C. 154(b) by 1804 days.

(21) Appl. No.: 12/455,669

(22) Filed: Jun. 4, 2009

(65) Prior Publication Data
US 2010/0140959 A1     Jun. 10, 2010

Related U.S. Application Data

(63) Continuation-in-part of application No. 12/386,054, filed on Apr. 13, 2009, which is a continuation-in-part of application No. 12/315,631, filed on Dec. 4, 2008, and a continuation-in-part of application No. 12/315,616, filed on Dec. 4, 2008.

(51) Int. Cl.
| F02B 63/04 | (2006.01) |
| F03G 7/08 | (2006.01) |
| H02K 7/18 | (2006.01) |
| F03G 7/04 | (2006.01) |

(52) U.S. Cl.
CPC ........................................ *F03G 7/04* (2013.01)

(58) Field of Classification Search
USPC ............... 290/1 R; 128/899; 600/16, 486; 604/891.1; 607/35; 623/3.12
See application file for complete search history.

(56) References Cited

U.S. PATENT DOCUMENTS

| 3,358,690 A | 12/1967 | Cohen |
| 3,421,512 A | 1/1969 | Frasier ............................ 607/35 |
| 3,456,134 A | 7/1969 | Ko |
| 3,522,811 A | 8/1970 | Schwartz et al. |
| 3,563,245 A | 2/1971 | McLean et al. |
| 3,649,615 A | 3/1972 | Ikeda et al. .................... 534/642 |
| 3,659,615 A | 5/1972 | Enger |

(Continued)

FOREIGN PATENT DOCUMENTS

| EP | 1764034 | 3/2007 |
| GB | 1220677 | 1/1971 |
| GB | 2350302 | 11/2000 |

OTHER PUBLICATIONS

Lucklum, et al., Acoustic Wave Generation and Detection in Non-Piezoelectric High-Q Resonators, Ultrasonic Symposium 2006, Oct. 2006, pp. 1132-1135.

(Continued)

*Primary Examiner* — Pedro J Cuevas
(74) *Attorney, Agent, or Firm* — Faisal K. Abou-Nasr; Advent, LLP

(57) ABSTRACT

A device for generating power from intraluminal pressure changes may comprise: (a) a generator configured for intraluminal disposal; and (b) an intraluminal pressure change-receiving structure.

A system for generating power from intraluminal pressure changes may comprise: means for receiving an intraluminal pressure change; and (b) means for converting the intraluminal pressure change into energy with an intraluminal generator.

8 Claims, 13 Drawing Sheets

(56) References Cited

U.S. PATENT DOCUMENTS

| | | | |
|---|---|---|---|
| 3,861,397 A | 1/1975 | Rao et al. | |
| 3,906,960 A | 9/1975 | Lehr | |
| 3,943,936 A | 3/1976 | Rasor et al. | 607/35 |
| 4,140,132 A | 2/1979 | Dahl | 607/19 |
| 4,294,891 A | 10/1981 | Yao et al. | |
| 4,453,537 A | 6/1984 | Spitzer | |
| 4,538,616 A | 9/1985 | Rogoff | 600/365 |
| 4,661,107 A | 4/1987 | Fink | |
| 4,690,143 A | 9/1987 | Schroeppel | 607/5 |
| 4,798,206 A | 1/1989 | Maddison et al. | 607/122 |
| 5,007,927 A | 4/1991 | Badylak et al. | |
| 5,010,893 A | 4/1991 | Sholder | |
| 5,022,395 A | 6/1991 | Russie | 607/16 |
| 5,062,841 A | 11/1991 | Siegel | 604/891.1 |
| 5,154,680 A | 10/1992 | Drzewiecki et al. | |
| 5,188,738 A | 2/1993 | Kaali et al. | 424/529 |
| 5,205,286 A | 4/1993 | Soukup et al. | |
| 5,344,385 A | 9/1994 | Buck et al. | |
| 5,348,019 A | 9/1994 | Sluss, Jr. et al. | |
| 5,363,855 A | 11/1994 | Drzewiecki et al. | |
| 5,411,537 A | 5/1995 | Munshi et al. | |
| 5,431,694 A | 7/1995 | Snaper et al. | 607/35 |
| 5,443,504 A | 8/1995 | Hill | |
| 5,457,624 A | 10/1995 | Hastings | |
| 5,522,394 A | 6/1996 | Zurbrugg | 600/459 |
| 5,535,752 A | 7/1996 | Halperin et al. | |
| 5,617,876 A | 4/1997 | van Duyl | |
| 5,626,141 A | 5/1997 | Takeda | 600/490 |
| 5,653,676 A | 8/1997 | Buck et al. | |
| 5,690,693 A | 11/1997 | Wang et al. | |
| 5,693,952 A | 12/1997 | Cox | |
| 5,701,919 A | 12/1997 | Buck et al. | |
| 5,702,431 A | 12/1997 | Wang et al. | |
| 5,713,939 A | 2/1998 | Nedungadi et al. | |
| 5,715,837 A | 2/1998 | Chen | |
| 5,734,564 A | 3/1998 | Brkovic | |
| 5,745,358 A | 4/1998 | Faulk | |
| 5,749,909 A | 5/1998 | Schroeppel et al. | |
| 5,764,495 A | 6/1998 | Faulk | |
| 5,810,015 A | 9/1998 | Flaherty | |
| 5,823,199 A | 10/1998 | Hastings et al. | |
| 5,954,058 A | 9/1999 | Flaherty | |
| 5,967,986 A | 10/1999 | Cimochowski et al. | 600/454 |
| 5,984,857 A | 11/1999 | Buck et al. | |
| 6,164,284 A | 12/2000 | Schulman et al. | |
| 6,268,161 B1 | 7/2001 | Han et al. | |
| 6,291,900 B1 | 9/2001 | Tiemann et al. | |
| 6,409,674 B1 | 6/2002 | Brockway et al. | |
| 6,432,050 B1 | 8/2002 | Porat et al. | |
| 6,475,750 B1 | 11/2002 | Han et al. | |
| 6,524,256 B2 | 2/2003 | Schaldach et al. | |
| 6,564,807 B1 | 5/2003 | Schulman et al. | |
| 6,580,177 B1 | 6/2003 | Hagood, IV et al. | |
| 6,589,184 B2 | 7/2003 | Norén et al. | |
| 6,635,048 B1 | 10/2003 | Ullestad et al. | 604/890.1 |
| 6,638,231 B2 | 10/2003 | Govari et al. | |
| 6,682,490 B2 | 1/2004 | Roy et al. | |
| 6,711,423 B2 | 3/2004 | Colvin, Jr. | |
| 6,802,811 B1 | 10/2004 | Slepian | 600/309 |
| 6,822,343 B2 | 11/2004 | Estevez | 290/1 R |
| 6,827,682 B2 | 12/2004 | Bugge et al. | 600/16 |
| 6,829,507 B1 | 12/2004 | Lidman et al. | 607/19 |
| 6,860,857 B2 | 3/2005 | Norén et al. | |
| 6,895,265 B2 | 5/2005 | Silver | |
| 6,937,894 B1 | 8/2005 | Isaac et al. | 607/5 |
| 6,953,469 B2 | 10/2005 | Ryan | |
| 7,032,600 B2 | 4/2006 | Fukuda et al. | |
| 7,033,322 B2 | 4/2006 | Silver | |
| 7,081,683 B2 | 7/2006 | Ariav | |
| 7,081,699 B2 | 7/2006 | Keolian et al. | |
| 7,167,756 B1 | 1/2007 | Torgerson et al. | 607/61 |
| 7,223,237 B2 | 5/2007 | Shelchuk | 600/309 |
| 7,241,266 B2 | 7/2007 | Zhou et al. | 600/365 |
| 7,263,894 B2 | 9/2007 | Tenerz | 73/756 |
| 7,302,856 B2 | 12/2007 | Tang et al. | |
| 7,362,557 B2 | 4/2008 | Soudier et al. | |
| 7,367,968 B2 | 5/2008 | Rosenberg et al. | 604/891.1 |
| 7,403,821 B2 | 7/2008 | Haugland et al. | 607/49 |
| 7,413,547 B1 | 8/2008 | Lichtscheidl et al. | |
| 7,424,325 B2 | 9/2008 | Koller et al. | |
| 7,425,200 B2 | 9/2008 | Brockway et al. | 600/486 |
| 7,427,265 B1 | 9/2008 | Keilman et al. | |
| 7,452,334 B2 | 11/2008 | Gianchandani et al. | |
| 7,465,313 B2 | 12/2008 | DiMauro et al. | 607/92 |
| 7,489,966 B2 | 2/2009 | Leinders et al. | 607/2 |
| 7,616,990 B2 | 11/2009 | Chavan et al. | |
| 7,616,992 B2 | 11/2009 | Dennis et al. | |
| 7,715,918 B2 | 5/2010 | Melvin | |
| 7,729,767 B2 | 6/2010 | Baker, III et al. | |
| 7,729,768 B2 | 6/2010 | White et al. | |
| 7,777,623 B2 | 8/2010 | Albsmeier et al. | |
| 7,798,973 B2 | 9/2010 | Stahmann | |
| 7,859,171 B2 | 12/2010 | Micallef | |
| 2002/0028999 A1 | 3/2002 | Schaldach et al. | |
| 2003/0158584 A1 | 8/2003 | Cates et al. | |
| 2004/0021322 A1 | 2/2004 | Ariav | |
| 2004/0039242 A1 | 2/2004 | Tolkoff et al. | |
| 2004/0078027 A1 | 4/2004 | Shachar | |
| 2004/0158294 A1 | 8/2004 | Thompson | |
| 2004/0173220 A1 | 9/2004 | Harry et al. | 128/892 |
| 2004/0193058 A1 | 9/2004 | Montegrande et al. | |
| 2004/0204744 A1 | 10/2004 | Penner et al. | |
| 2004/0215279 A1 | 10/2004 | Houben et al. | 607/35 |
| 2005/0055061 A1 | 3/2005 | Holzer | |
| 2005/0080346 A1 | 4/2005 | Gianchandani et al. | |
| 2005/0256549 A1 | 11/2005 | Holzer | 607/35 |
| 2005/0261563 A1 | 11/2005 | Zhou et al. | 600/347 |
| 2006/0044078 A1 | 3/2006 | Ayazi et al. | 333/186 |
| 2006/0152309 A1 | 7/2006 | Mintchev et al. | |
| 2006/0184206 A1 | 8/2006 | Baker, III et al. | |
| 2006/0217776 A1 | 9/2006 | White et al. | |
| 2006/0224214 A1 | 10/2006 | Koller et al. | |
| 2006/0247724 A1 | 11/2006 | Gerber et al. | 607/41 |
| 2007/0074731 A1 | 4/2007 | Potter | |
| 2007/0088402 A1 | 4/2007 | Melvin | |
| 2007/0093875 A1 | 4/2007 | Chavan et al. | |
| 2007/0142728 A1 | 6/2007 | Penner et al. | |
| 2007/0149885 A1 | 6/2007 | Corl et al. | |
| 2007/0167988 A1 | 7/2007 | Cernasov | 607/35 |
| 2007/0221233 A1 | 9/2007 | Kawano et al. | |
| 2007/0293904 A1 | 12/2007 | Gelbart et al. | |
| 2008/0009687 A1 | 1/2008 | Smith et al. | |
| 2008/0021333 A1 | 1/2008 | Huelskamp | |
| 2008/0082005 A1 | 4/2008 | Stern et al. | |
| 2008/0132967 A1 | 6/2008 | Von Arx et al. | |
| 2008/0172043 A1 | 7/2008 | Sheppard et al. | |
| 2008/0212262 A1 | 9/2008 | Micallef | |
| 2008/0262562 A1 | 10/2008 | Roberts et al. | |
| 2008/0281298 A1 | 11/2008 | Andersen et al. | |
| 2009/0171413 A1 | 7/2009 | Zenati et al. | 607/32 |
| 2009/0171448 A1 | 7/2009 | Eli | |
| 2009/0270742 A1 | 10/2009 | Wolinsky et al. | |
| 2009/0281399 A1 | 11/2009 | Keel et al. | |
| 2009/0292335 A1 | 11/2009 | Leonov | |
| 2010/0010600 A1 | 1/2010 | Eriksson et al. | 607/116 |
| 2010/0030043 A1 | 2/2010 | Kuhn | |
| 2010/0036450 A1 | 2/2010 | Axelrod et al. | 607/35 |
| 2010/0049275 A1 | 2/2010 | Chavan et al. | |
| 2010/0076517 A1 | 3/2010 | Imran | |
| 2010/0140943 A1 | 6/2010 | Hyde et al. | |
| 2010/0140956 A1 | 6/2010 | Hyde et al. | |
| 2010/0140957 A1 | 6/2010 | Hyde et al. | |
| 2010/0140958 A1 | 6/2010 | Hyde et al. | |
| 2010/0140959 A1 | 6/2010 | Hyde et al. | |
| 2010/0141052 A1 | 6/2010 | Hyde et al. | |
| 2010/0228312 A1 | 9/2010 | White et al. | |
| 2010/0298720 A1 | 11/2010 | Potkay | |
| 2011/0062713 A1 | 3/2011 | Ardoise et al. | 290/53 |
| 2011/0094314 A1 | 4/2011 | Dekker et al. | 73/862.045 |
| 2011/0275947 A1 | 11/2011 | Feldman et al. | 600/508 |

(56) References Cited

U.S. PATENT DOCUMENTS

OTHER PUBLICATIONS

Franklin Hadley, Goodbye Wires . . . , MIT News, Jun. 7, 2007, Publisher: http://web.mit.edu/newsoffice/2007/wireless-0607.html, Published in: US.

Chaimanonart, et al., Implantable RF Power Converter for Small Animal in Vivo Biological Monitoring, Sep. 1-4, 2005, Publisher: Proceedings of the 2005 IEEE Engineering in Medicine and Biology 27th Annual Conference.

Zhong Lin Wang, Self-Powered Nanotech: Nanosize Machines Need Still Tinier Power Plants, Scientific American Magazine, Dec. 16, 2007, pp. 82-87, Published in: US.

Dmitriev, et al., Tunable High-Q Surface-Acoustic-Wave Resonator, http://www.ingentaconnect.com/content/maik/10637842/2007/00000052/ . . . , Aug. 2007, pp. 1061-1067, vol. 52, No. 8, Publisher: MAIK Nauka/Interperiodica.

Kara Gavin, Zapping the Heart Back Into Rhythm, University of Michigan Health Minute, Jun. 2, 2005, Published in: Ann Arbor, MI.

DEVICE AND SYSTEM FOR GENERATION OF POWER FROM INTRALUMINAL PRESSURE CHANGES

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of the U.S. patent application having U.S. Postal patent application Ser. No. 12/315,631, titled Method for Generation of Power from Intraluminal Pressure Changes, naming Roderick A. Hyde, Muriel Y. Ishikawa, Eric C. Leuthardt, Michael A. Smith, Lowell L. Wood, Jr. and Victoria Y. H. Wood as inventors, filed Dec. 4, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/315,616, titled "Method for Generation of Power from Intraluminal Pressure Changes", naming Roderick A. Hyde, Muriel Y. Ishikawa, Eric C. Leuthardt, Michael A. Smith, Lowell L. Wood, Jr. and Victoria Y. H. Wood as inventors, filed Dec. 4, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/386,054, titled "Method for Generation of Power from Intraluminal Pressure Changes", naming Roderick A. Hyde, Muriel Y. Ishikawa, Eric C. Leuthardt, Michael A. Smith, Lowell L. Wood, Jr. and Victoria Y. H. Wood as inventors, filed Apr. 13, 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

Small-scale generators for generating energy at levels suitable for powering devices which are in vivo or ex vivo to a human or animal are described. Such generators may be implanted in luminal structures so as to extract power from intraluminal pressure changes.

DETAILED DESCRIPTION

Figure 1:
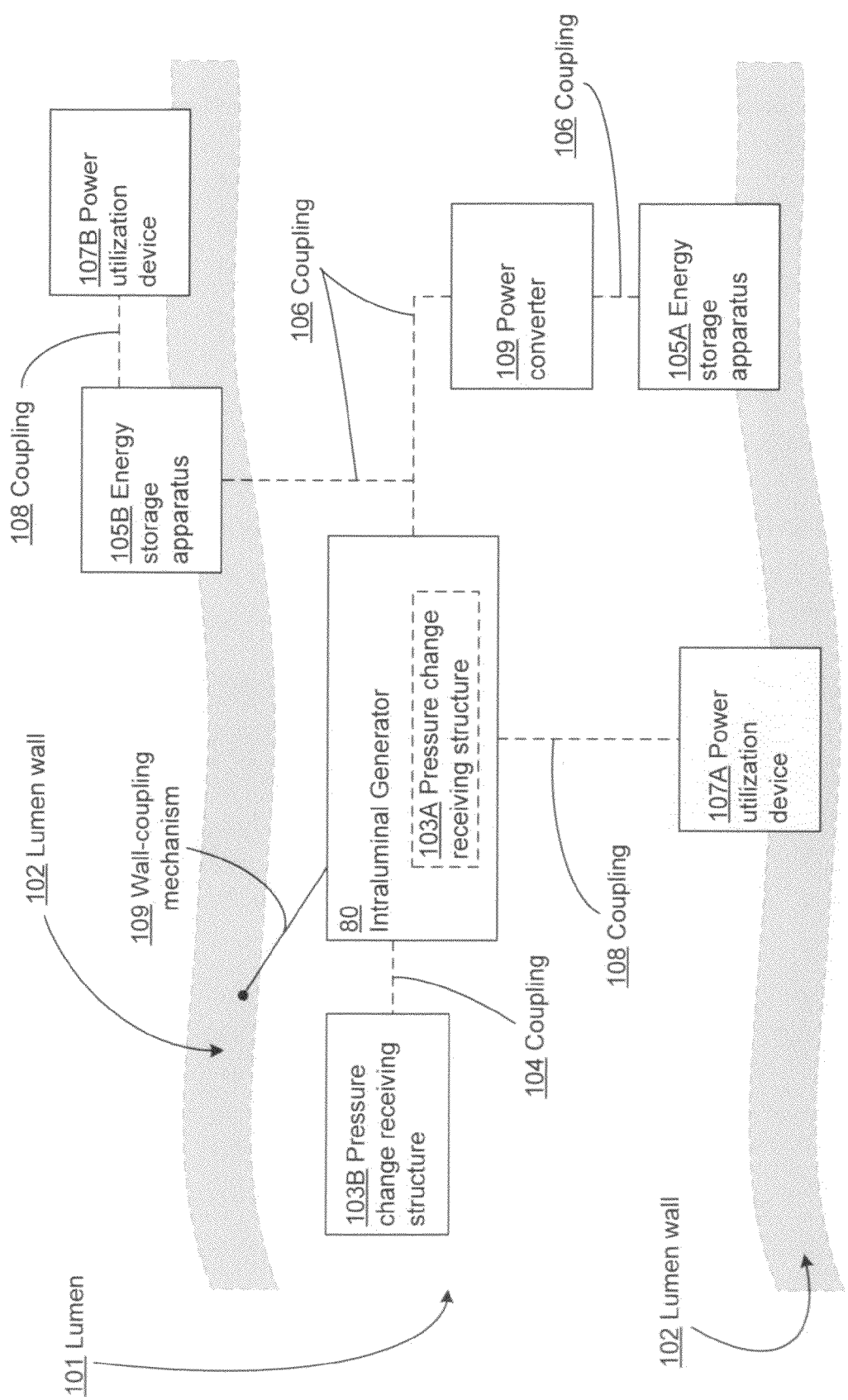
FIG. 1 shows a high-level block diagram of an intraluminal power generation device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 2:
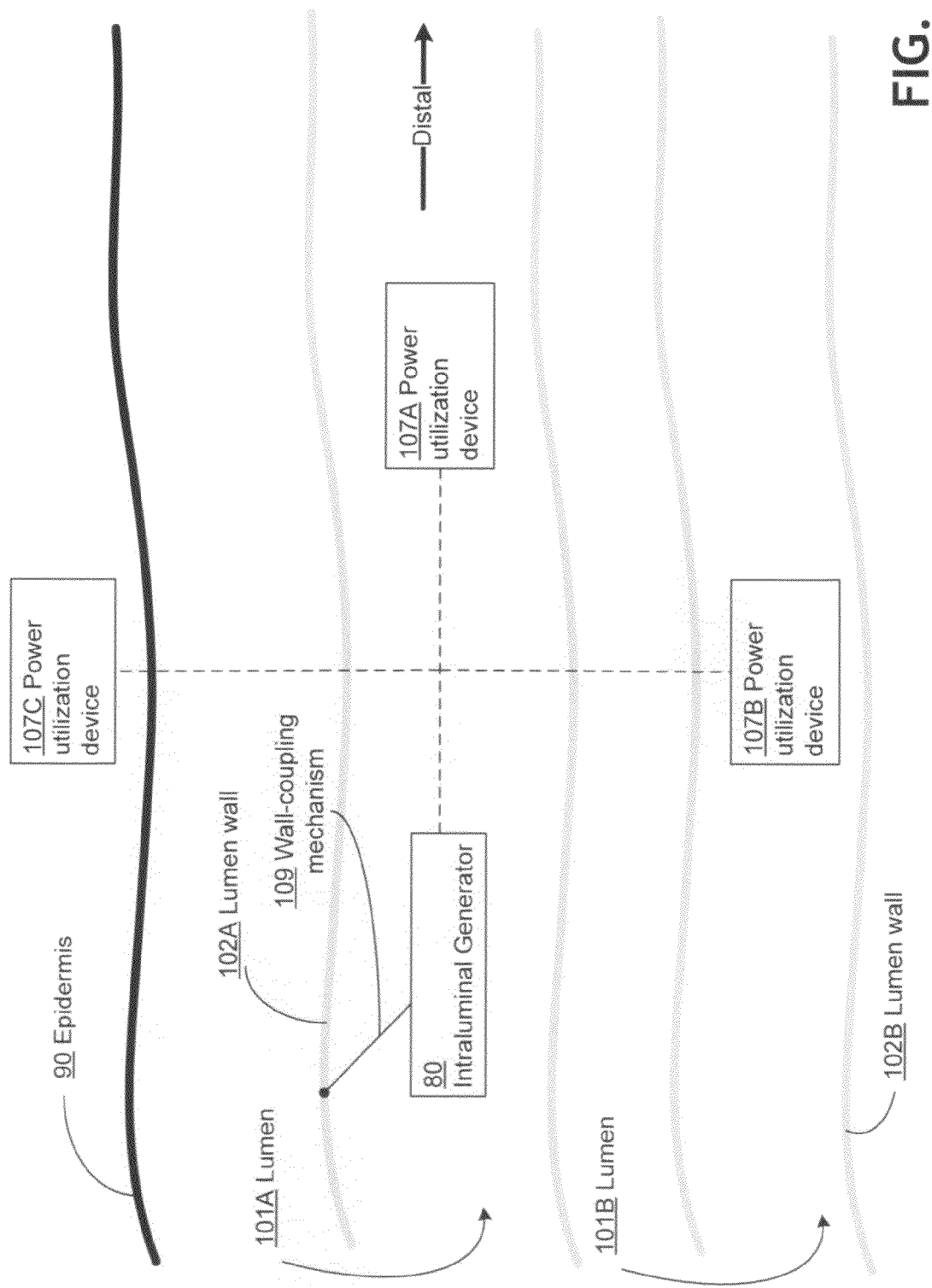
FIG. 2 shows a high-level block diagram of an intraluminal power generation device.
Figure 3:
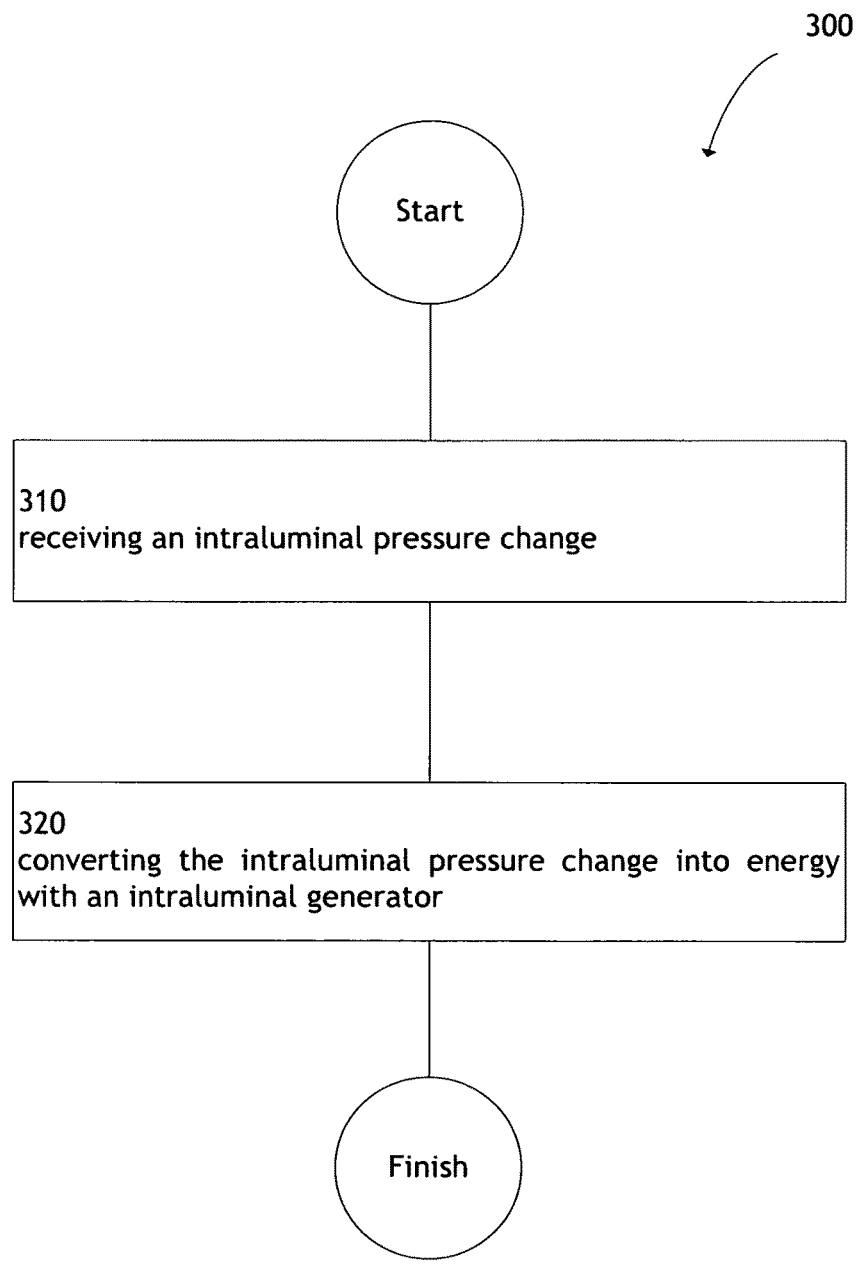
FIG. 3 shows a process for intraluminal power generation.
Figure 4:
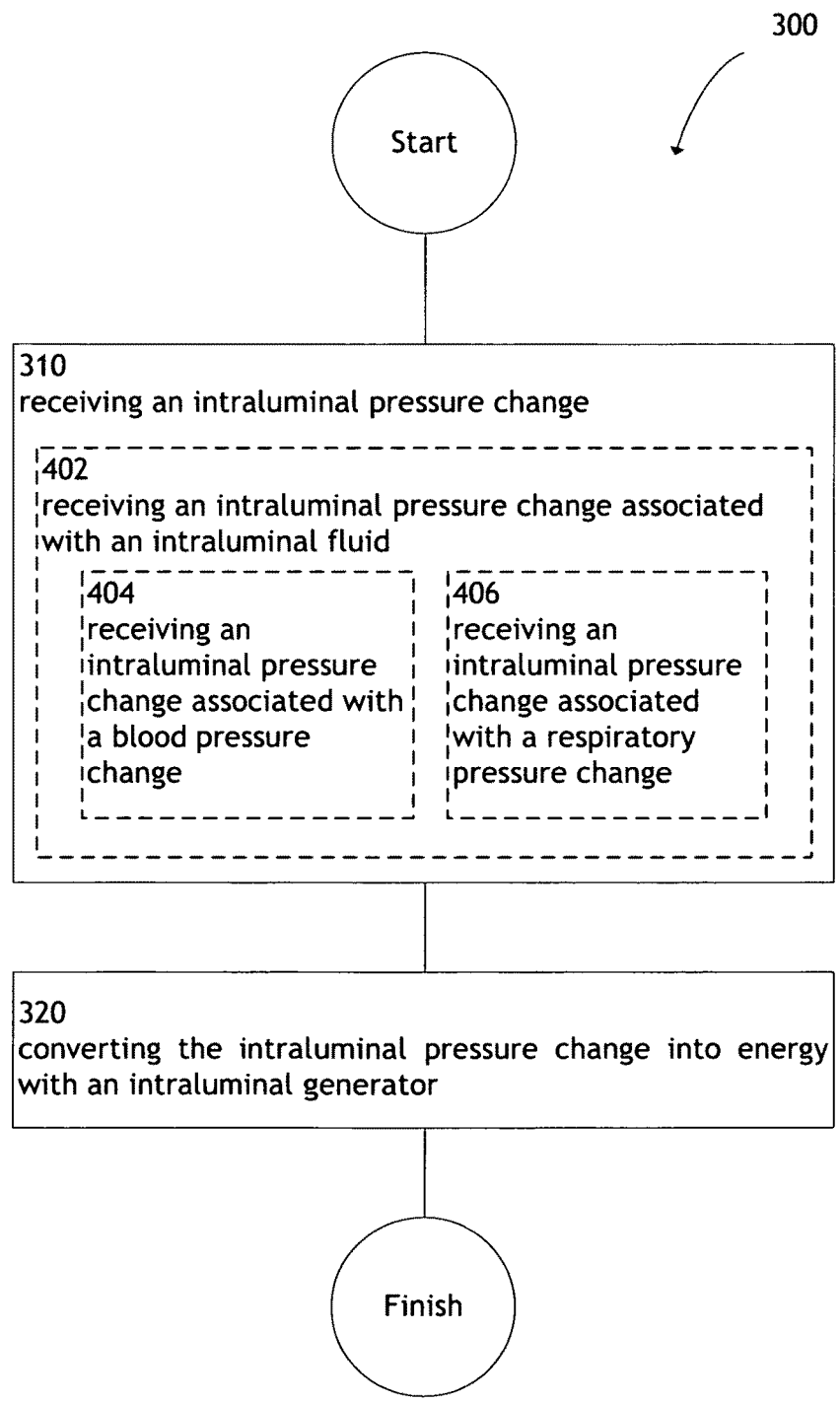
FIG. 4 shows a process for intraluminal power generation.
Figure 5:
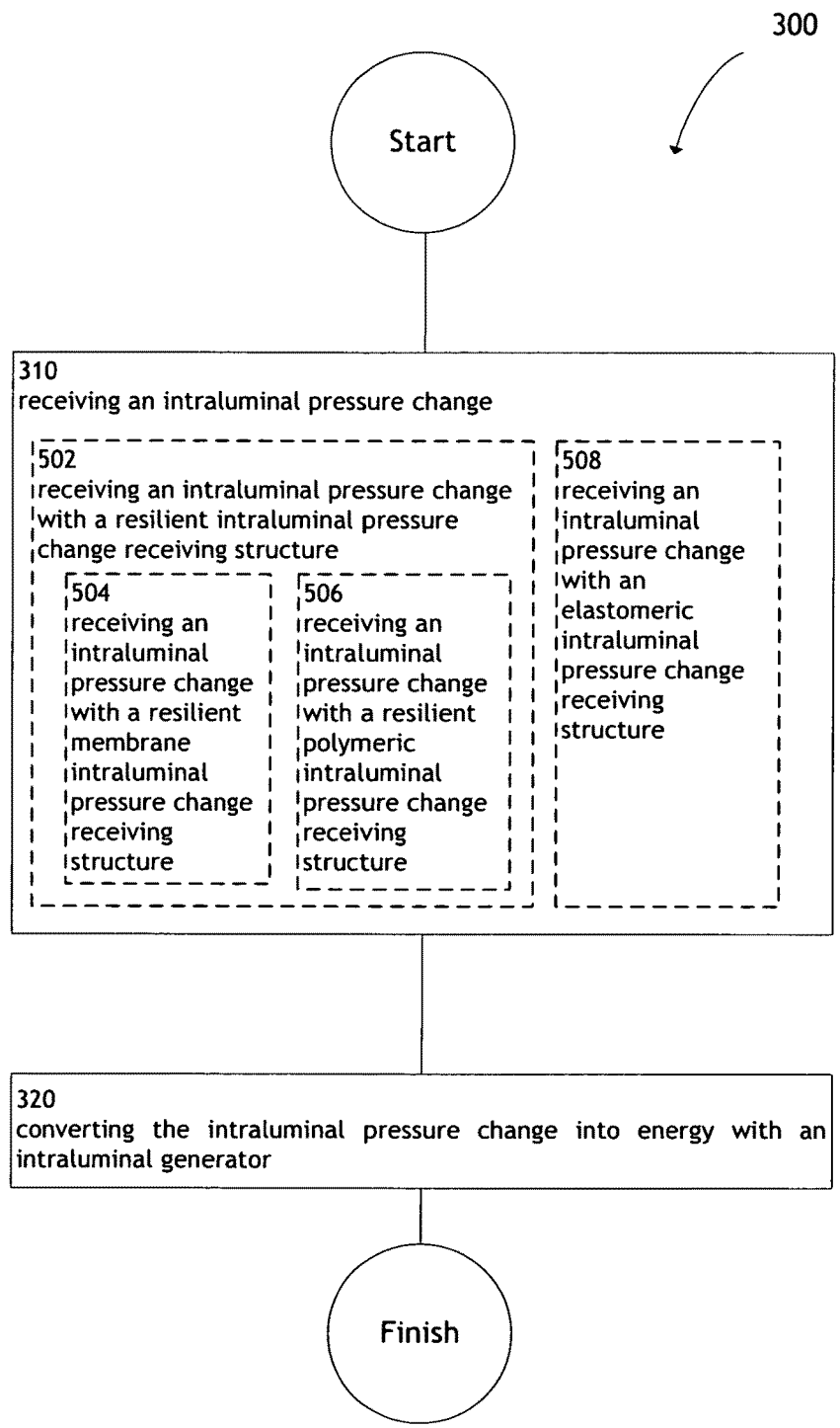
FIG. 5 shows a process for intraluminal power generation.
Figure 6:
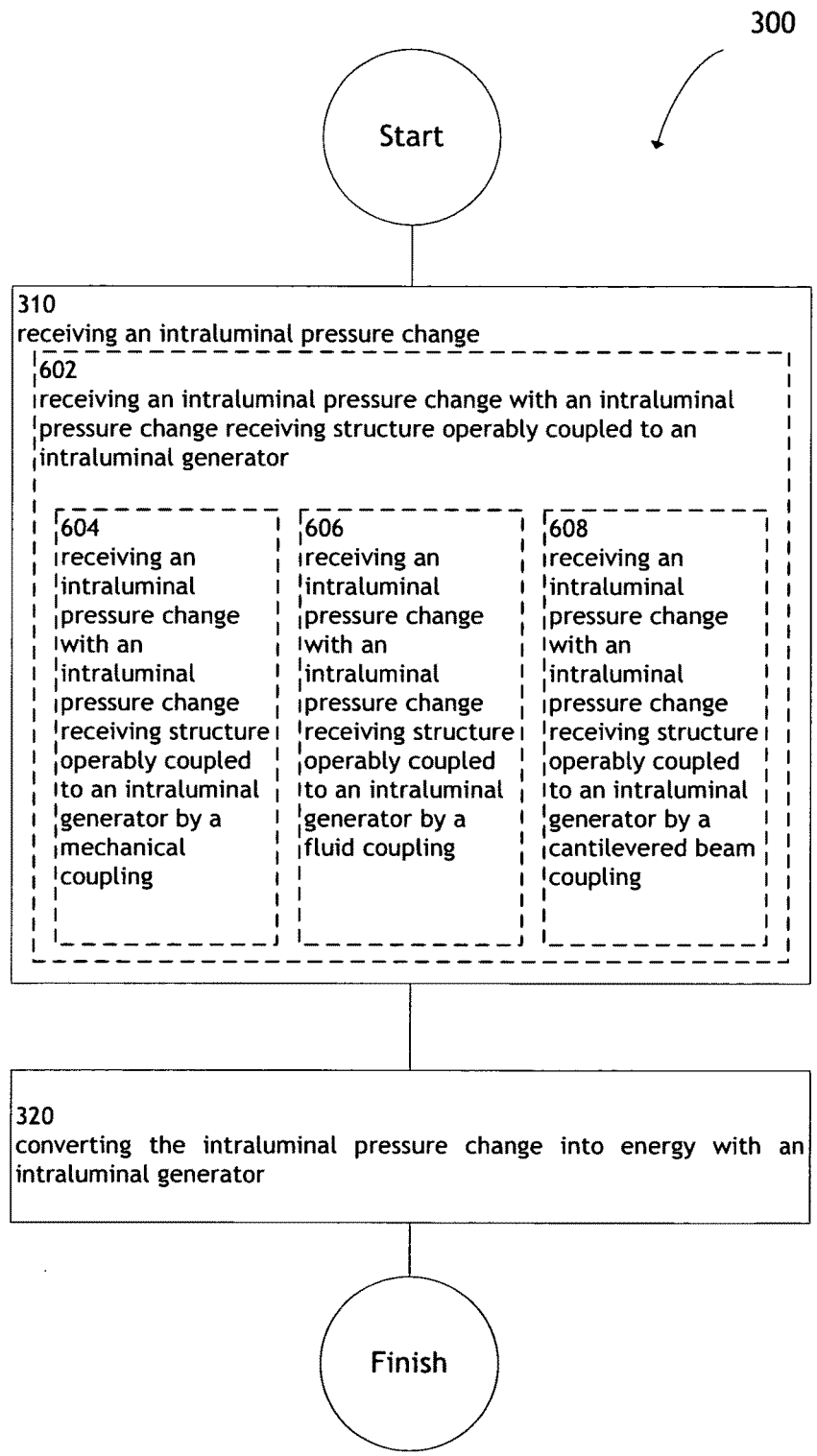
FIG. 6 shows a process for intraluminal power generation.
Figure 7:
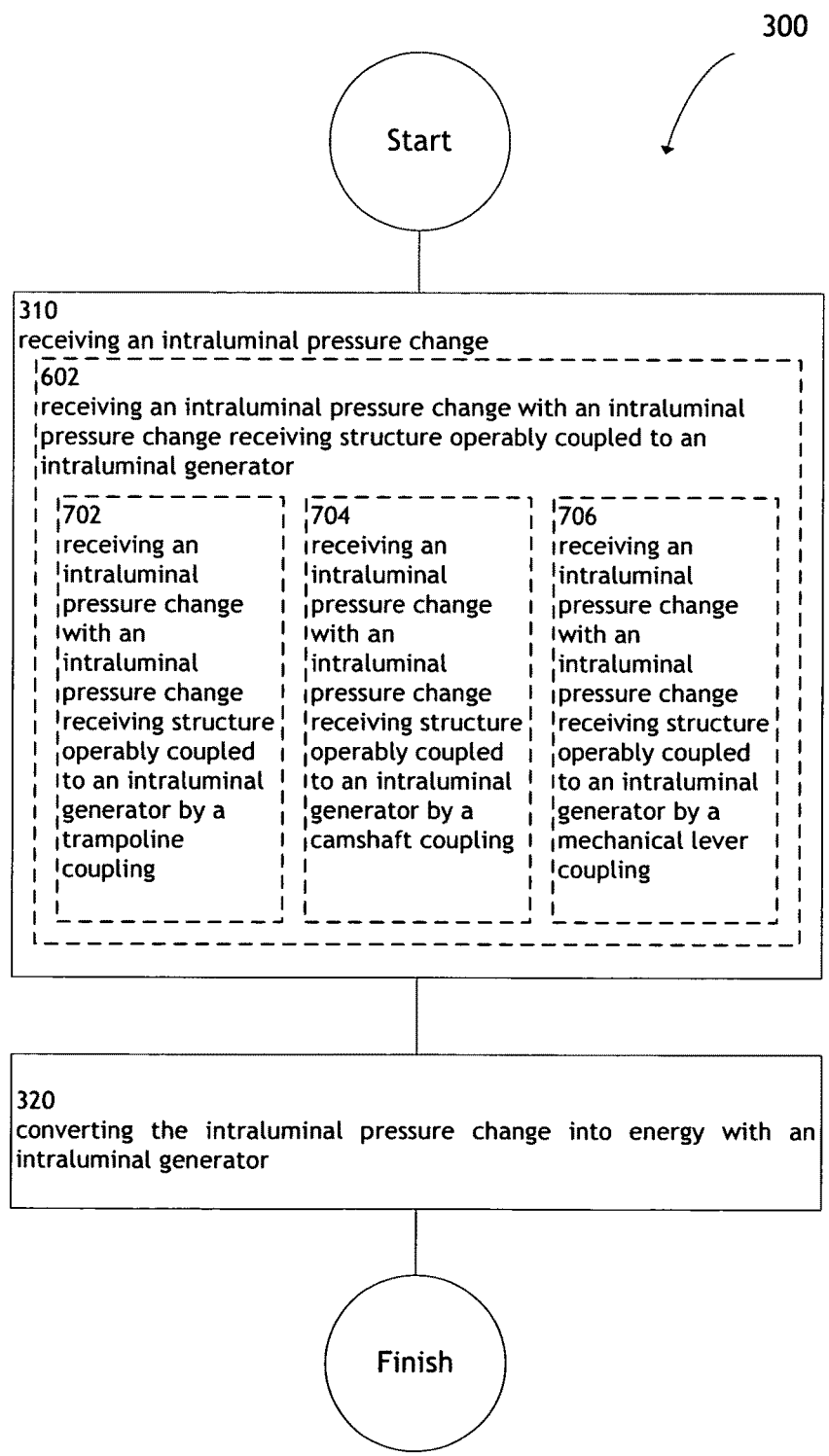
FIG. 7 shows a process for intraluminal power generation.
Figure 8:
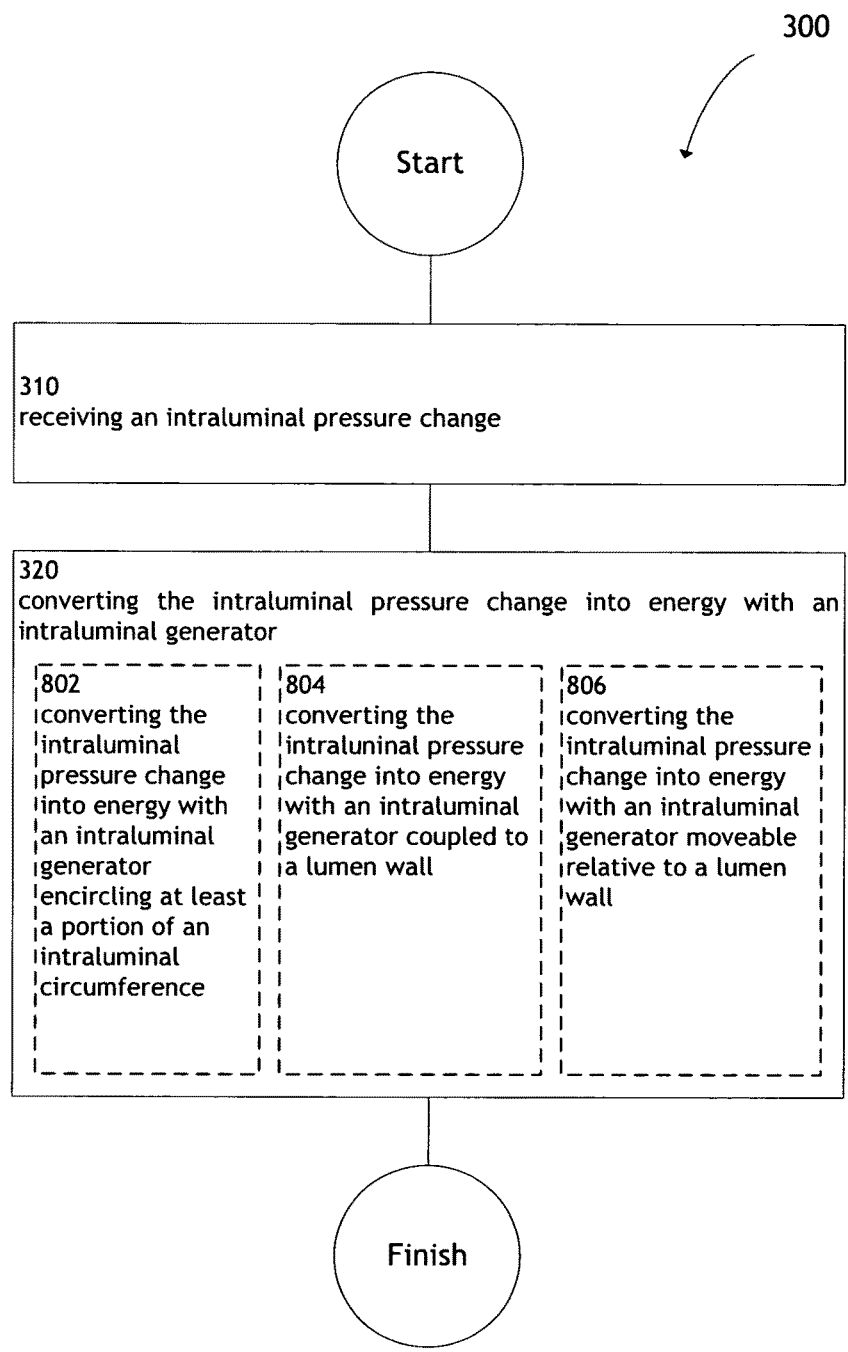
FIG. 8 shows a process for intraluminal power generation.
Figure 9:
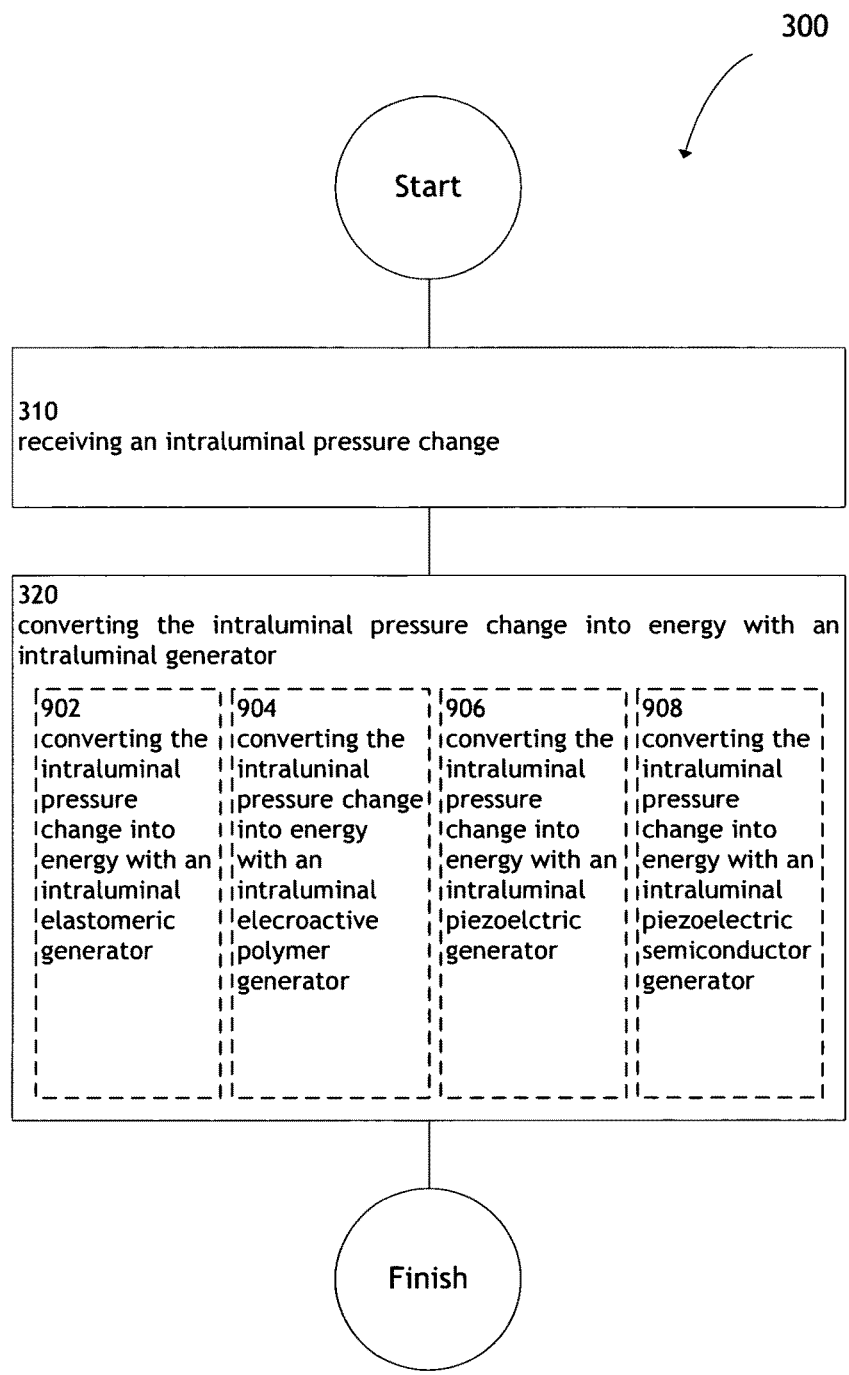
FIG. 9 shows a process for intraluminal power generation.
Figure 10:
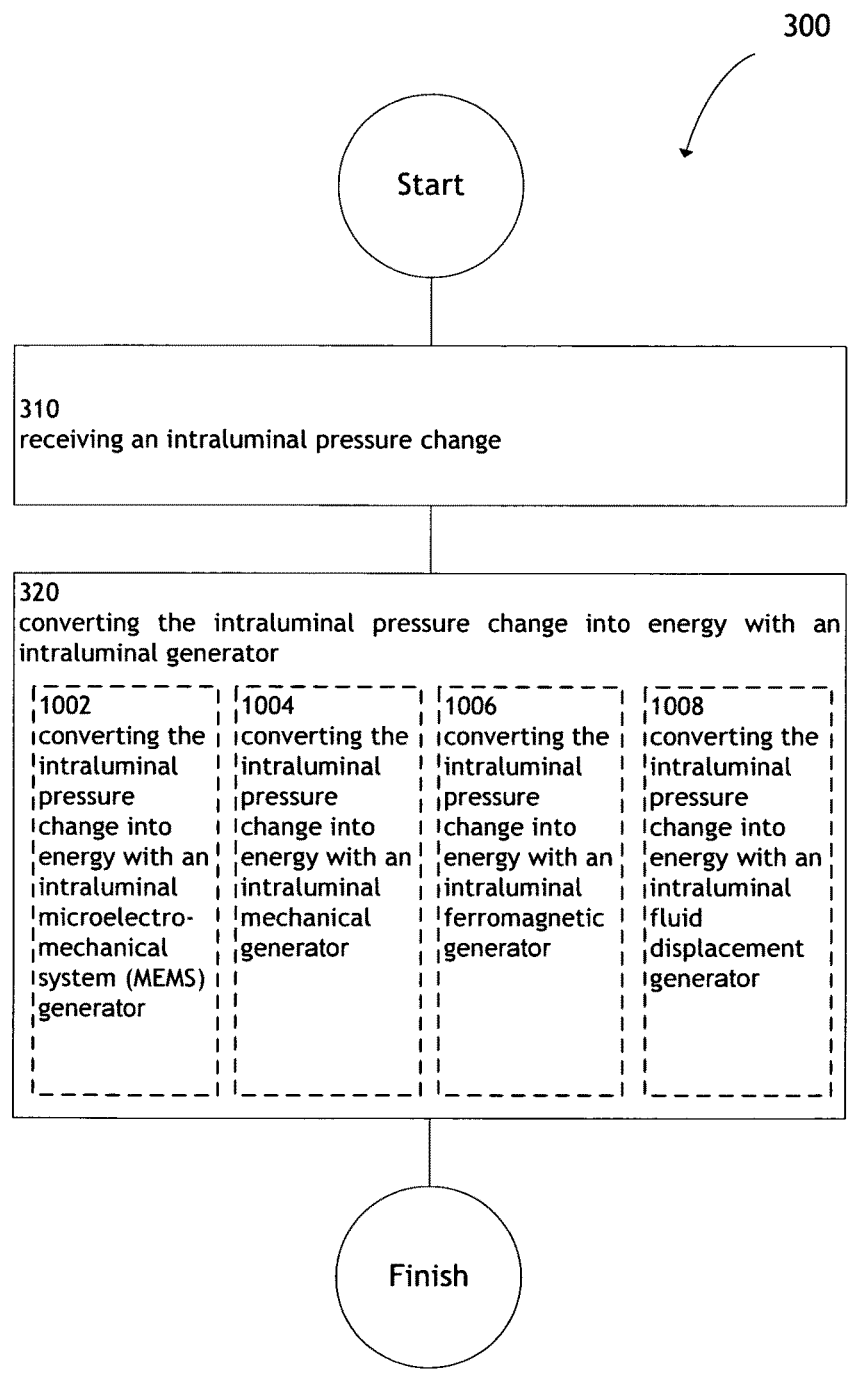
FIG. 10 shows a process for intraluminal power generation.
Figure 11:
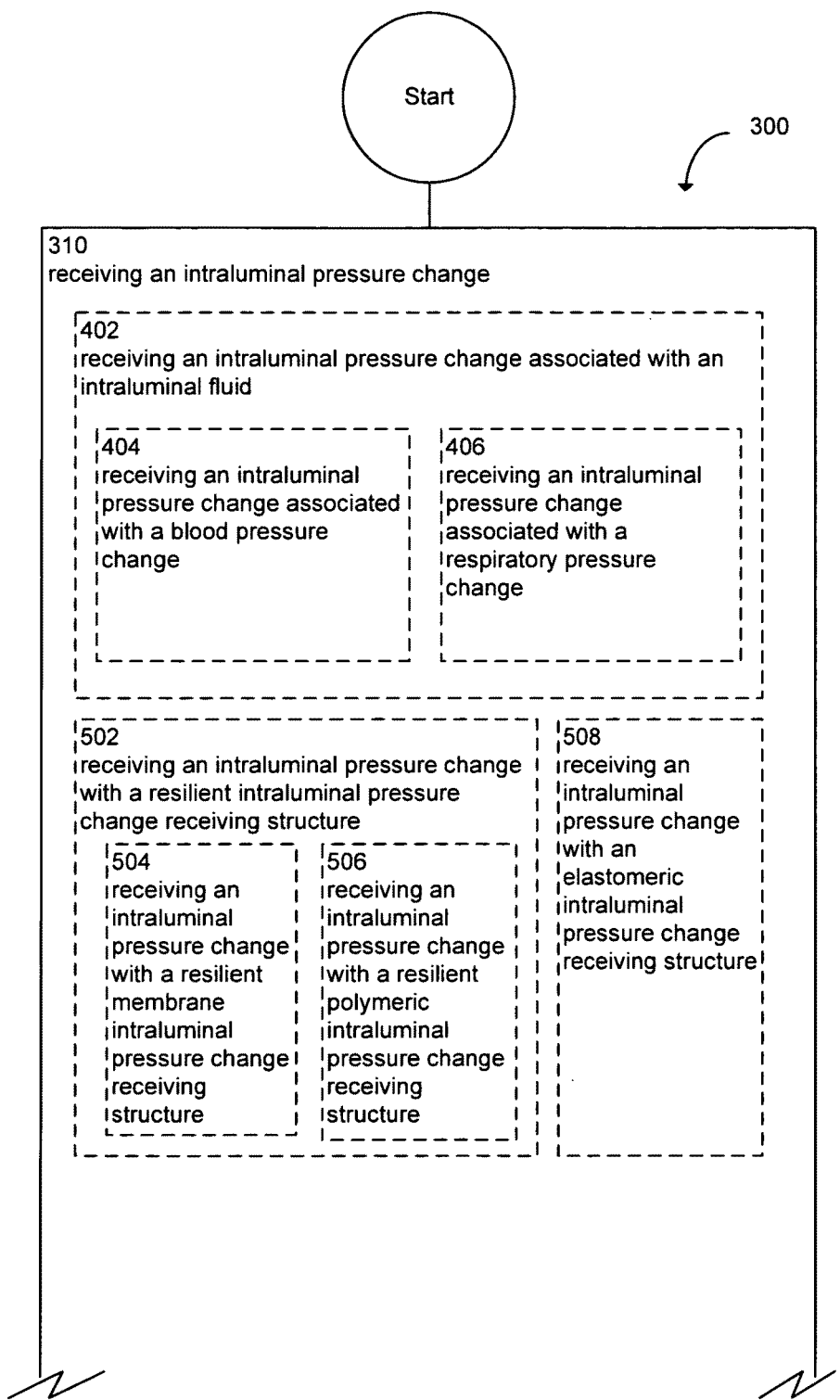
FIG. 11 shows a process for intraluminal power generation.
Figure 11:
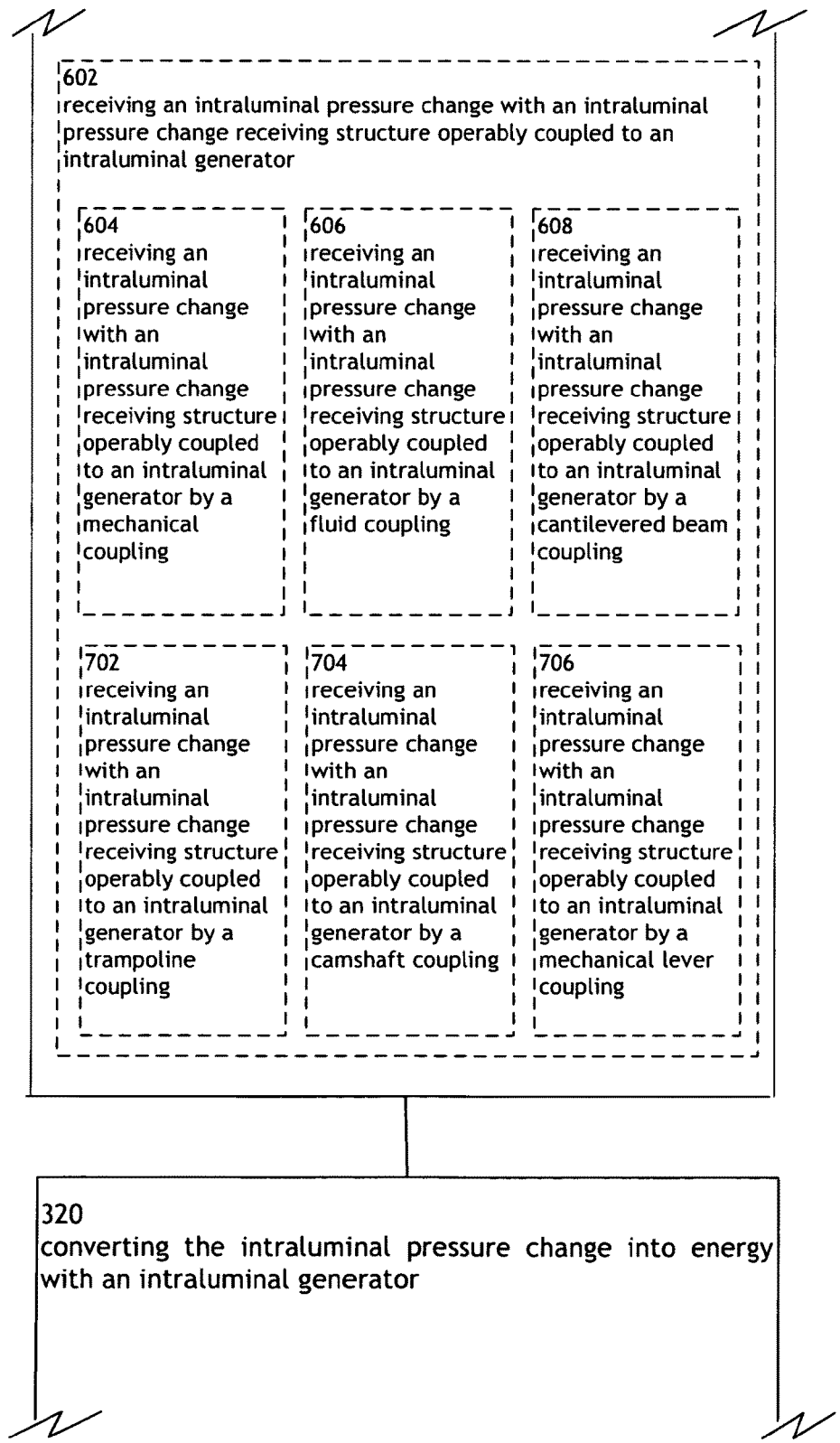
Figure 11:
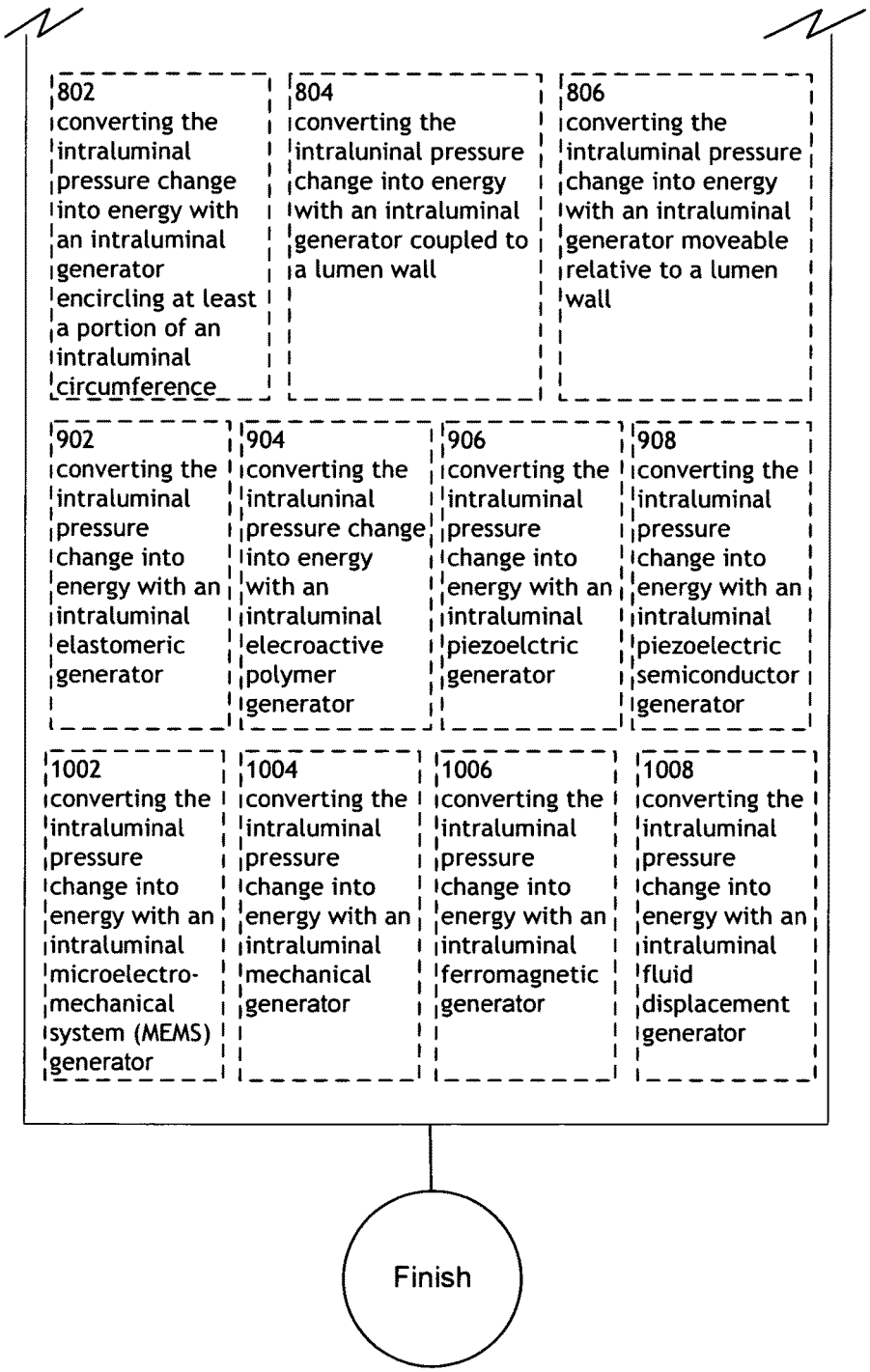

FIGS. 1 and 2 illustrate example environments in which one or more technologies may be implemented. An intraluminal power generation device may comprise an intraluminal generator 100 configured for disposal within an anatomical lumen 101 defined by a lumen wall 102. The intraluminal generator 100 may be configured to convert a varying intraluminal pressure change into energy (e.g. electrical energy, mechanical/elastic energy, chemical energy, thermal energy).

The intraluminal generator 100 may include an integrated pressure change-receiving structure 103A configured to receive a pressure change associated with a fluid pressure within the lumen 101. Alternately, the pressure change-receiving structure 103 may be an external pressure change-receiving structure 103B operably coupled to the intraluminal generator 100 via a coupling 104 to transfer a received pressure from the pressure change-receiving structure 103B to the intraluminal generator 100 in a form which the intraluminal generator 100 may convert to energy.

The intraluminal power generation device may comprise an energy storage apparatus 105 for storage of energy generated by the intraluminal generator 100. The energy storage apparatus 105 may be operably coupled to the intraluminal generator 100 by a coupling 106.

The intraluminal power generation device may comprise a power utilization device 107 which may use energy generated by the intraluminal generator 100 or stored in the energy storage apparatus 105 to carry out a desired function. The power utilization device 107 may be operably coupled to the intraluminal generator 100 or an energy storage apparatus 105 by a coupling 108.

FIG. 2 illustrates various configurations of the one or more components of the intraluminal power generation device. The intraluminal generator 100 may be operably coupled to power utilization device 107A disposed in a first lumen 101A (e.g. in a distal relationship to the power utilization device 107A). An intraluminal generator 100 disposed within in a first lumen 101A may be operably coupled to power utilization device 107B disposed in a second lumen 101B. An intraluminal generator 100 disposed within in a first lumen 101A may be operably coupled to an ex vivo power utilization device 107C disposed outside the lumen or outside an epidermis layer 110.

Referring to FIGS. 1-3 and 11, a change in pressure within the lumen 101 may be received by a pressure change-receiving structure 103. The pressure change-receiving structure 103 may receive a change in pressure through exposure of a surface of the pressure change-receiving structure 103 to the luminal environment such that a change in the intraluminal pressure may exert a force on the pressure change-receiving structure 103 thereby resulting in a movement and/or deformation of the pressure change-receiving structure 103.

Referring to FIGS. 1-3 and 11, a movement and/or deformation of the pressure change-receiving structure 103 may be translated either directly (e.g. the intraluminal generator 100 comprises the pressure change-receiving structure 103A) or indirectly (e.g. the pressure change-receiving structure 103B is operably coupled to a generator) into energy either through the motion of the pressure change-receiving structure 103 and/or the electrical properties of the materials comprising the pressure change-receiving structure 103 and/or the intraluminal generator 100.

Referring to FIGS. 1-2, 4 and 11, the pressure change-receiving structure 103 may be an intraluminal fluid pressure change-receiving structure. For example, as shown in FIG. 1, a change in pressure associated with a fluid flowing within lumen 101 may be received by the pressure change-receiving structure 103 through physical contact of the fluid with a pressure-receiving surface of the pressure change-receiving structure 103.

Referring to FIGS. 1-2, 4 and 11, the pressure change-receiving structure 103 may be an intraluminal blood pressure change-receiving structure. For example, as shown in FIG. 1, a change in pressure associated with a transition between a diastolic and systolic state of the heart chamber lumen 101a may induce a change in pressure in blood flowing within the lumen 101. The blood may exert a varying pressure on the pressure change-receiving structure 103.

Referring to FIGS. 1-2, 4 and 11, the pressure change-receiving structure 103 may be an intraluminal respiratory pressure change-receiving structure. For example, as shown in FIG. 1, a change in pressure associated with a transition between inhalation and exhalation of a lung lumen 101 may induce a change in air pressure within the lumen 101. The air may exert a varying pressure on the pressure change-receiving structure 103.

Referring to FIGS. 1-2, 5 and 11, the pressure change-receiving structure 103 may be a resilient intraluminal pressure change-receiving structure. For example, as shown in FIG. 1, pressure change-receiving structure 103 may be a resilient structure capable of deforming elastically upon application of pressure by an intraluminal fluid in lumen 101 and then returning to its original conformation upon a reduction of pressure by the intraluminal fluid in lumen 101.

Referring to FIGS. 1-2, 5 and 11, the pressure change-receiving structure 103 may be a resilient membrane intraluminal pressure change-receiving structure. For example, as shown in FIG. 1, pressure change-receiving structure 103 including a resilient membrane structure disposed over a free-space void thereby partitioning the free-space void from the luminal environment so as to provide a cavity for deformation of the membrane in response to the application of pressure by an intraluminal fluid. The interior of the free-space void defined by the membrane may be evacuated (e.g. to approximate systolic pressure); pressurized (e.g. to approximate diastolic pressure); filled with a compressible or non-compressible fluid so as to either assist or inhibit movement of the membrane between an original conformation and a distended conformation associated with a change in intraluminal pressure and/or translate the movement of the membrane into a pressurization of the free-space void or a fluid contained therein.

Referring to FIGS. 1-2, 5 and 11, the pressure change-receiving structure 103 may be a resilient polymeric intraluminal pressure change-receiving structure. For example, as shown in FIG. 1, pressure change-receiving structure 103 including a resilient polymeric structure. A resilient polymeric structure may include, but is not limited to, polymethacrylate, polyethylene glycol (PEG), polyethylene, polyetheretherketone (PEEK), polytetrafluoroethylene (Teflon), epoxy (e.g. Epo-Tek 353ND) and the like.

Referring to FIGS. 1-2, 5 and 11, the pressure change-receiving structure 103 may be an elastomeric intraluminal pressure change-receiving structure. For example, as shown in FIG. 1, pressure change-receiving structure 103 may include an elastomeric structure. An elastomeric structure may include, but is not limited to, polymethyl silanes (e.g. those manufactured by NuSil Technologies), polymethyl siloxanes, polyurethane, polyether/polyester copolymers, and the like.

Referring to FIGS. 1-2, 6 and 11, the pressure change-receiving structure 103 may be an external pressure change-receiving structure 103B operably coupled to the intraluminal generator 100 by a coupling 104 so as to translate a pressure received by the pressure change-receiving structure 103 into a force exerted on the intraluminal generator 100.

Referring to FIGS. 1-2, 6 and 11, the pressure change-receiving structure 103 may be operably coupled to intraluminal generator 100 by a mechanical coupling 104 (e.g. a connecting shaft, wire, piston and the like).

Referring to FIGS. 1-2, 6 and 11, the pressure change-receiving structure 103B may be operably coupled to the intraluminal generator 100 by a fluid coupling 104 (e.g. fluid filled conduit, hydraulic line, pneumatic line, and the like). For example, the pressure change-receiving structure 103 may include fluid filled reservoir operably coupled to a fluid filled hydraulic coupling 104. A pressure received by the pressure change-receiving structure 103B may exert a force on the fluid filled reservoir which may pressurize the hydraulic coupling 104, thereby translating the force to the intraluminal generator 100.

Referring to FIGS. 1-2, 6 and 11, the pressure change-receiving structure 103B may be operably coupled to intraluminal generator 100 by a cantilevered beam coupling 104. For example, the pressure change-receiving structure 103 may be disposed at an unsupported portion of the cantilevered beam coupling 104 and the intraluminal generator 100 connected at a supported portion of the beam. A movement of the pressure change-receiving structure 103 may impart a moment force at the connection point of the cantilevered beam coupling 104 with the intraluminal generator 100.

Referring to FIGS. 1-2, 7 and 11, the pressure change-receiving structure 103B may be operably coupled to intraluminal generator 100 by a trampoline coupling 104. A trampoline coupling may include a membrane that may receive an intraluminal pressure change. An areal force applied to the membrane may result in a tension force at the rim of the membrane that may act on the intraluminal generator 100.

Referring to FIGS. 1-2, 7 and 11, the pressure change-receiving structure 103B may be operably coupled to intraluminal generator 100 by a camshaft coupling 104. The pressure change-receiving structure 103 may be coupled to a first end of a camshaft coupling 104. A movement of the pressure change-receiving structure 103 may cause the camshaft coupling 104 to rotate. The movements of the cams of the camshaft coupling 104 may, in turn, move various portions of the intraluminal generator 100 (e.g. ferromagnetic portions) so as to generate energy.

Referring to FIGS. 1-2, 7 and 11, the pressure change-receiving structure 103B may be operably coupled to intraluminal generator 100 by a mechanical lever coupling 104. The pressure change-receiving structure 103B may be coupled to a first end of a mechanical lever coupling 104 and the intraluminal generator 100 may be coupled to a second end of the mechanical lever coupling 104. A movement of the pressure change-receiving structure 103B may cause the first end of the mechanical lever coupling 104 to impart a corresponding movement in second end of the mechanical lever coupling 104. The movement of the second end of the mechanical lever may, in turn, move various portions of the intraluminal generator 100 (e.g. ferromagnetic portions) so as to generate energy.

Referring to FIGS. 1-3 and 11, the intraluminal generator 100 may be a generator configured for intraluminal disposal. For example, as shown in FIG. 1, the intraluminal generator 100 may be disposed (e.g. surgically implanted) within in a lumen 101. The intraluminal generator 100 may be coupled to the wall of the lumen 101 to maintain the intraluminal generator 100 in place. The intraluminal generator 100 may comprise biocompatible materials (e.g. ultra high molecular weight polyethylene, polysulfone, polypropylene, titanium, and the like) such that the intraluminal generator 100 may be suitable for disposal within the lumen 101. The exterior surface of the intraluminal generator 100 may be configured such that the flow characteristics of a fluid moving through the lumen 101 are substantially maintained (e.g. the flow rate of the fluid, the flow dynamics of the fluid, and the like are not substantially disrupted.) The intraluminal generator 100 may be a stent-type structure.

A movement and/or deformation of the pressure change-receiving structure 103 may be translated either directly (e.g. the intraluminal generator 100 comprises the pressure change-receiving structure 103A) or indirectly (e.g. the pressure change-receiving structure 103B is operably coupled to a generator) into energy either through the motion of the pressure change-receiving structure 103 and/or the electrical properties of the materials comprising the pressure change-receiving structure 103.

Referring to FIGS. 1-2, 8 and 11, the intraluminal generator 100 may be a generator configured for intraluminal disposal encircling at least a portion of an intraluminal circumference. For example, as shown in FIG. 1, the intraluminal generator 100 may be configured in at least a partially ring-shaped manner such that it may be secured within the lumen 101 by contacting at least a portion of the lumen wall 102 while still permitting fluid flow through the lumen 101 (e.g. a stent-type structure).

Referring to FIGS. 1-2, 8 and 11, the intraluminal generator 100 may include a lumen wall-coupling mechanism. For example, as shown in FIG. 1, the intraluminal generator 100 may be coupled to the lumen wall 102 via one or more wall-coupling mechanisms 109 (e.g. via mechanical attachments such as hooks, barbs, and anchors, via bioadhesives, via friction from a radially applied force, or similar mechanisms).

Referring to FIGS. 1-2, 8 and 11, the intraluminal generator 100 may be a lumen wall-coupling mechanism configured to allow the generator configured for intraluminal disposal to move relative to a lumen wall. For example, as shown in FIG. 1, the intraluminal generator 100 may be tethered (e.g. by a cord-type mechanical attachment 109) to the lumen wall 102 so as to restrict axial movement along the length of the lumen 101 while permitting radial movement across the width of the lumen 101 as fluid flows through the lumen 101.

Referring to FIGS. 1-2, 9 and 11, the intraluminal generator 100 may be an electroactive polymeric generator configured for intraluminal disposal. For example, as shown in FIG. 1, the intraluminal generator 100 may include an electroactive polymer. The electroactive polymer may include at least one of a dielectric electroactive polymer (e.g. electrostrictive polymers, dielectric elastomers) and ionic electroactive polymers (e.g. conductive polymers, ionic polymer-metal composites, responsive gels, Bucky gel actuators).

Referring to FIGS. 1-2, 9 and 11, the intraluminal generator 100 may be a piezoelectric generator configured for intraluminal disposal. For example, as shown in FIG. 1, intraluminal generator 100 may include a piezoelectric structure. The piezoelectric structure may include at least one of a naturally occurring crystal (e.g. berlinite, quartz, Rochelle salt, topaz, and tourmaline-group minerals), a manufactured crystal (e.g. gallium orthophosphate, langasite), a manufactured ceramic (e.g. barium titanate, lead titanate, lead zirconate titanate, potassium niobate, lithium niobate, lithium tantalite, sodium tungstate, Sodium potassium niobate, bismuth ferrite), and a polymer (e.g. Polyvinylidene fluoride).

Referring to FIGS. 1-2, 9 and 11, the intraluminal generator 100 may be a piezoelectric semiconductor generator configured for intraluminal disposal. For example, as shown in FIG. 1, intraluminal generator 100 may include a piezoelectric semiconductor (e.g. collagen, zinc oxide, bismuth silicone oxide, gallium arsenide, cadmium sulfide) structure.

Referring to FIGS. 1-2, 10 and 11, the intraluminal generator 100 may be a microelectromechanical device (MEMS) generator configured for intraluminal disposal. For example, as shown in FIG. 1, intraluminal generator 100 may include a MEMS generator. The MEMS generator may include those described in "Multi-Watt Electric Power from a Microfabricated Permanent-Magnet Generator" by Das, et al (see http://mtlweb.mit.edu/research/annual_reports/2005/ms/ms_42.pdf); "MEMS Generator of Power Harvesting by Vibrations using Piezoelectric Cantilever Beam with Digitate Electrode" by Lee, et al., (see http://adsabs.harvard.edu/abs/2006SPIE.6169 . . . 63L); and/or "Novel MEMS Power Generator with Integrated Thermoelectric and Vibrational Devices" by Sato, et al., The 13th International Conference on Solid-state Sensors, Actuators and Microdevices, Seoul, Korea, June 59,2005 (see http://ieeexplore.ieee.org/application/enterprise/entconfirmation.jsp?arnumber=1496415), and the like.

Referring to FIGS. 1-2, 10 and 11, the intraluminal generator 100 may be a mechanical generator configured for intraluminal disposal. For example, as shown in FIG. 1, intraluminal generator 100 may be capable of converting motion of the pressure change-receiving structure 103 into mechanical energy. The intraluminal generator 100 may include a piston, lever, spring, or ratchet mechanism operably coupled.

Referring to FIGS. 1-2, 10 and 11, the intraluminal generator 100 may be a ferromagnetic generator configured for intraluminal disposal. For example, as shown in FIG. 1, intraluminal generator 100 may include a ferromagnetic (e.g. magnetized iron, nickel cobalt) structure which may be disposed proximate to an electrical circuit whereby motion of the pressure change-receiving structure 103 may affect an associated movement of the ferromagnetic portion, thereby inducing a current in the circuit via magnetic induction.

Referring to FIGS. 1-2, 10 and 11, the intraluminal generator 100 may be a fluid displacement generator configured for intraluminal disposal. For example, as shown in FIG. 1, a fluid displacement intraluminal generator 100 may be a pump (e.g. a positive displacement pump) including one or more pump rotors. The motion of the pressure change-receiving structure 103 may rotate the one or more rotors within the intraluminal generator 100 thereby increasing a pressure of a fluid contained within an associated device (e.g. a hydraulic line).

The herein described subject matter may illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such intent will be explicitly recited in the claim and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, the convention (e.g., "a device having at least one of A, B, and C" would include but not be limited to devices that have A alone, B alone, C alone, A and B together, A and C together, B and C together, and/or A, B, and C together, etc.). In those instances where a convention analogous to "at least one of A, B, or C, etc." is used, in general such a construction is intended (e.g., "a device having at least one of A, B, or C" would include but not be limited to devices that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A power generation device comprising:
   a generator configured for intraluminal disposal; and
   a deformable intraluminal pressure change-receiving structure operably coupled to the generator, the deformable intraluminal pressure change-receiving structure configured to generate an electric current energy under deformation;
   wherein the deformable intraluminal pressure change-receiving structure comprises:
   a resilient deformable intraluminal pressure change-receiving structure; and
   wherein the resilient deformable intraluminal pressure change-receiving structure comprises:
   a resilient polymeric deformable intraluminal pressure change-receiving structure.

2. A power generation device comprising:
   a generator configured for intraluminal disposal; and
   a deformable intraluminal pressure change-receiving structure operably coupled to the generator, the deformable intraluminal pressure change-receiving structure configured to generate an electric current energy under deformation;
   wherein the deformable intraluminal pressure change-receiving structure comprises:
   an elastomeric deformable intraluminal pressure change-receiving structure.

3. A power generation device comprising:
   a generator configured for intraluminal disposal;
   a deformable intraluminal pressure change-receiving structure operably coupled to the generator, the deformable intraluminal pressure change-receiving structure configured to generate an electric current energy under deformation; and a coupling between the deformable intraluminal pressure change-receiving structure and the generator configured for intraluminal disposal;

wherein the coupling between the deformable intraluminal pressure change-receiving structure and the generator configured for intraluminal disposal comprises:

a trampoline coupling.

4. A power generation device comprising:

a generator configured for intraluminal disposal;

a deformable intraluminal pressure change-receiving structure operably coupled to the generator, the deformable intraluminal pressure change-receiving structure configured to generate an electric current energy under deformation;

a coupling between the deformable intraluminal pressure change-receiving structure and the generator configured for intraluminal disposal;

wherein the coupling between the deformable intraluminal pressure change-receiving structure and the generator configured for intraluminal disposal comprises:

a camshaft coupling.

5. A system comprising:

means for receiving an intraluminal pressure change, the means for receiving an intraluminal pressure change configured for deformation responsive to the intraluminal pressure change; and means for converting the intraluminal pressure change into energy with an intraluminal generator;

wherein the means for receiving an intraluminal pressure change comprises:

means for receiving an intraluminal pressure change with a resilient intraluminal pressure receiving structure; and wherein the means for receiving an intraluminal pressure change with a resilient intraluminal pressure receiving structure comprises:

means for receiving an intraluminal pressure change with a resilient polymeric intraluminal pressure receiving structure.

6. A system comprising:

means for receiving an intraluminal pressure change, the means for receiving an intraluminal pressure change configured for deformation responsive to the intraluminal pressure change; and means for converting the intraluminal pressure change into energy with an intraluminal generator;

wherein the means for receiving an intraluminal pressure change comprises:

means for receiving an intraluminal pressure change with an elastomeric intraluminal pressure change-receiving structure.

7. A system comprising:

means for receiving an intraluminal pressure change, the means for receiving an intraluminal pressure change configured for deformation responsive to the intraluminal pressure change; and means for converting the intraluminal pressure change into energy with an intraluminal generator;

wherein the means for receiving an intraluminal pressure change comprises:

means for receiving an intraluminal pressure change with an intraluminal pressure change-receiving structure operably coupled to an intraluminal generator; and wherein the means for receiving an intraluminal pressure change with an intraluminal pressure change-receiving structure operably coupled to an intraluminal generator comprises:

means for receiving an intraluminal pressure change with an intraluminal pressure change-receiving structure operably coupled to an intraluminal generator by a trampoline coupling.

8. A system comprising:

means for receiving an intraluminal pressure change, the means for receiving an intraluminal pressure change configured for deformation responsive to the intraluminal pressure change; and means for converting the intraluminal pressure change into energy with an intraluminal generator;

wherein the means for receiving an intraluminal pressure change comprises:

means for receiving an intraluminal pressure change with an intraluminal pressure change-receiving structure operably coupled to an intraluminal generator; and wherein the means for receiving an intraluminal pressure change with an intraluminal pressure change-receiving structure operably coupled to an intraluminal generator comprises:

means for receiving an intraluminal pressure change with an intraluminal pressure change-receiving structure operably coupled to an intraluminal generator by a camshaft coupling.

\* \* \* \* \*